United States Patent [19]

Magnuson

[11] 3,960,027

[45] June 1, 1976

[54] BICYCLE PEDAL ATTACHMENT

[76] Inventor: Leo D. Magnuson, 2928 Summit Hills Court, Bettendorf, Iowa 52722

[22] Filed: Oct. 8, 1975

[21] Appl. No.: 620,838

[52] U.S. Cl. .............................. 74/594.6; 280/291; 74/594.1
[51] Int. Cl.² ......................................... G05G 1/14
[58] Field of Search ............ 74/594.6, 594.4, 594.5, 74/594.1, 562; 280/291

[56] References Cited
UNITED STATES PATENTS

| 639,132 | 12/1899 | Avery | 74/594.6 |
| 1,120,460 | 12/1914 | Dunlap et al. | 74/563 |
| 1,157,140 | 10/1915 | Anderson | 74/562 |

FOREIGN PATENTS OR APPLICATIONS

| 485,748 | 5/1938 | United Kingdom | 74/594.6 |
| 703,040 | 1/1954 | United Kingdom | 74/594.6 |

Primary Examiner—M. H. Wood, Jr.
Assistant Examiner—Jack D. Rubenstein
Attorney, Agent, or Firm—Glenn H. Antrim

[57] ABSTRACT

A supporting strip to which is applied upward spring tension has an inwardly inclined heel member to be urged against the heel of a bicyclist. The heel member permits upward force on the crank of a bicycle such that driving force can be applied from each pedal to the crank most of the time during each revolution.

4 Claims, 4 Drawing Figures

BICYCLE PEDAL ATTACHMENT

BACKGROUND OF THE INVENTION

This invention relates to attachments for bicycle pedals and particularly to attachments that permits driving force to be applied to the cranks of bicycles during upward travel of the pedals.

Commonly, driving force is applied to bicycle pedals only during their downward travel. However, in racing bicycles, toe straps and shoe cleats are used to apply upward force on the pedals. The use of toe straps and shoe cleats have not become popular because the bicyclists may not be able to remove their feet from the toe straps quickly enough to prevent injury as the bicycles tip.

SUMMARY OF THE INVENTION

The attachment according to the present invention has a supporting strip attached to a pedal of a bicycle, and a heel member extending upwardly from the rear end of the strip. A bicyclist applies force to the heel member for applying force through the strip to pull upwardly on the pedal. The supporting strip is attached to the pedal and extends rearwardly below the bicyclist's shoe, and it is inclined upwardly by spring tension to cause that end having the heel member to be urged upwardly against the heel of a bicyclist's shoe.

DESCRIPTION OF THE PREFERRED EMBODIMENTS

Figure 1:
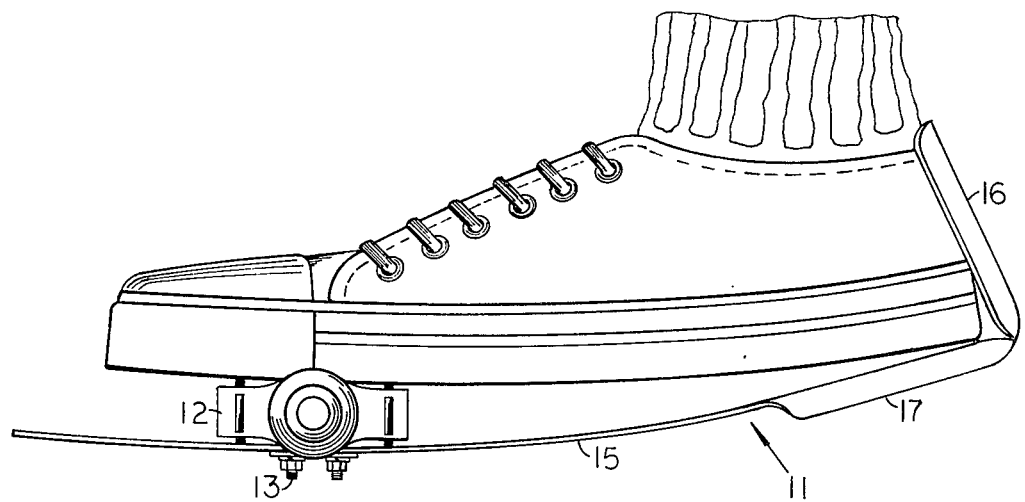
FIG. 1 is a side view of a preferred embodiment of the pedal attachment of this invention.
Figure 2:
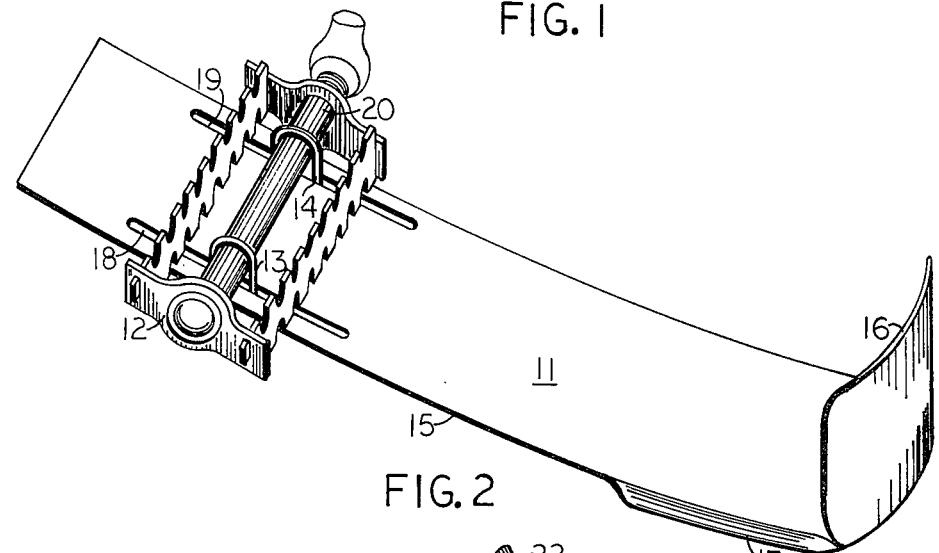
FIG. 2 is an oblique view of the preferred embodiment to show the adjustable means for securing it to a pedal.

With reference to FIGS. 1 and 2, a pedal attachment 11 is connected to a bicycle pedal 12 by a pair of yokes or U-bolts 13 and 14. The pedal attachment 11 comprises a generally horizontal portion or supporting strip 15 and an upright heel member 16. The supporting strip 15 extends rearwardly from the lower face of the pedal 12 and the upright heel member 16 is turned upright at the rear portion of the strip. The attachment 11 is fabricated from material such as spring steel that has sufficient spring tension to maintain the rear portion of the strip 15 upwardly against the heel of a bicyclist's shoe. A rear portion of the strip 15 for supporting the heel may be made stiffer than that portion closer to the pedal 12 by being formed for reinforcement, for example, by having on each of its sides a lip 17 turned downwardly. The heel member 16 comprises a curved plate to fit about the back of the heel portion of a bicyclist's shoe. The heel member 16 is a continuation of the strip 15 and is bent at an angle of 90° or at an angle somewhat greater than 90° such that it is inclined inwardly somewhat from a line perpendicular to the strip 17 for engaging the upper portion of the heel of a bicyclist's shoe.

As shown in FIG. 2, to position the heel member 16 for different sizes of shoes, the portion of the strip 15 that is to be placed below the pedal 12 and the toe of a bicyclist has either a pair of spaced longitudinal slots 18 and 19 or two rows of closely spaced holes (not shown). A pair of U-bolts 13 and 14 are placed over a barrel 20 of the pedal 12, and their ends are inserted through the respective slots 18 and 19. Washers and nuts are used on the ends of the U-bolts in the usual manner to tighten the strip 15 to the pedal 12. A spacer (not shown) may be inserted between the barrel 20 and the strip 15. The spacer is needed particularly to prevent excessive bending by the tightening of the nuts on the U-bolts 13 and 14 when the supporting strip 15 is fabricated for economy from thin, reinforced material. By loosening the nuts on the U-bolts 13 and 14, the pedal attachment 11 can be moved longitudinally with respect to the pedal 12. To prevent the strip 15 from extending forwardly far enough to contact the front tire of a bicycle when the front wheel is turned, the length of the strip 15 and the length of the slots 18 and 19 should be proportioned such that the rear end of the slots function as a stop while the strip is adjusted to accommodate a shoe of small size.

Figure 3:
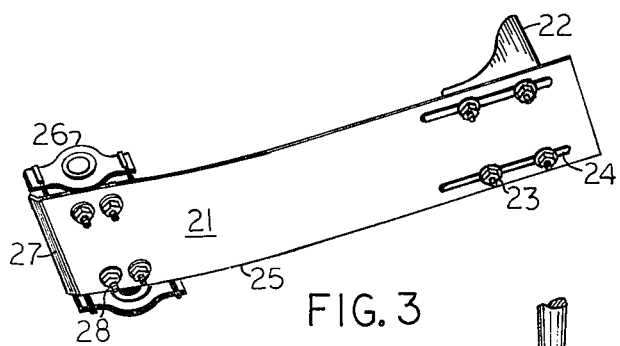
FIG. 3 is a bottom, oblique view of a modification of the preferred embodiment to show different mounting and adjusting means.

The embodiment shown in FIG. 3 has a separate heel member 22 fastened to a supporting strip 25 by bolts 23 that extend through a pair of longitudinal slots 24 in the strip 25. In this manner the adjustment for different lengths of shoes is provided at the heel member 22 rather than at the portion of the strip 25 that is connected to a pedal 26. The end of the strip 25 opposite the heel member 22 is turned up to provide a short lip 27 to rest against an edge of either a metal or a rubber crossbar or tread of the pedal 26. U-bolts 28 corresponding to U-bolts 13 and 14 of FIGS. 1 and 2 fit over the barrel of the pedal 26 and through holes rather than slots in the supporting strip 25.

Figure 4:
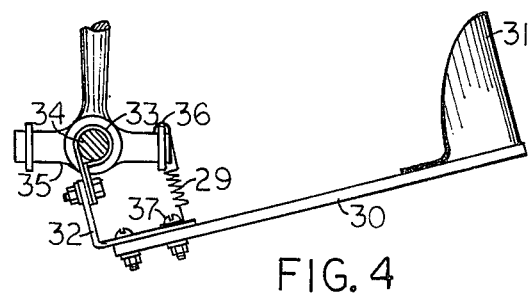
FIG. 4 is a side view of a different embodiment of a pedal attachment using a coiled spring.

In the embodiment shown in FIG. 4, a coiled spring 29 and a stiff elongated board or plate 30 is used in place of the spring steel supporting strip described above. A heel member 31 shaped like the heel members 16 and 22 of FIGS. 2 and 3 respectively is secured to one end of the board 30, and a mounting bracket 32 is secured to the other end of the board. The bracket 32 is L-shape, one end being secured to the top of the board 30 and the other end having an eye or loop 33 for encircling the barrel 34 of a pedal 35. One end of the coiled spring that functions as a tension spring has a hook formed to fit over the center portion of a tread 36 of the pedal 35, and the other end of the spring has a loop to be connected about a fastener that is positioned in the board 30 below and a little back of the tread 36.

In use, the position of the supporting strip 15 is dependent on the force applied by the bicyclist to the face of the pedal opposite to that to which the supporting strip is attached. The upward angle of the supporting strip 15 and the spring tension of the strip are sufficient to maintain the rear portion of the strip constantly against the heel of the bicyclist. As a pedal approaches its lowest position, a bicyclist turns his foot with the heel inclined upwardly and pulls upwardly against the heel member 16 to apply force to the pedal until it approaches its upward position. At this point, the bicyclist may incline his foot in an opposite direction to apply a forward force to the pedal as it revolves past the highest point. To aid in applying the forward force, the bicyclist can use a toe strap with or without the use of a shoe cleat. If a cleat is used, it may need only one ridge across it to fit against a crosspiece of the pedal to be effective for applying the forward motion and yet allow easy removal of the bicyclist's foot from the pedal during an emergency. Alternately, the present pedal attachment may have an upwardly turned piece for engaging the toe of the shoe of the bicyclist.

I claim:

1. A bicycle pedal attachment having a heel member for engaging the back of a bicyclist's shoe comprising: a supporting strip of sufficient length to extend rearwardly from a bicycle pedal below the sole of a bicyclist's shoe to the back thereof, means for attaching one end of said supporting strip to a pedal of a bicycle such that said strip extends rearwardly past that portion of a crossbar of a pedal that faces downwardly while said pedal attachment is being used, spring means for urging said rearwardly extending portion of said strip obliquely upwardly with respect to the face of a pedal against which the sole of a bicyclist's shoe is to be pressed, said heel member extending upwardly from the other end of said strip for engaging that portion of a shoe back of the upper portion of a bicyclist's heel, and said strip having sufficient freedom of motion and said spring means having sufficient spring tension to urge said strip and said heel member upwardly against the heel of a bicyclist's shoe for all normal inclinations of the heel during normal revolutions of a bicycle pedal to which said strip is attached.

2. A bicycle pedal attachment as claimed in claim 1 wherein said supporting strip and said spring means comprises a strip of steel that has spring characteristics.

3. A bicycle pedal attachment as claimed in claim 2 wherein said means for attaching one end of said strip includes a longitudinal slot through said one end of said supporting strip and a yoke adapted to extend through said slot and over a barrel of a bicycle pedal, said slot providing longitudinal adjustment of said supporting strip with respect to a pedal to which the strip is to be attached.

4. A bicycle attachment as claimed in claim 1 wherein said means for attaching one end of said strip includes an eye to be mounted about the barrel of a pedal, said supporting strip being easily pivoted on said eye about a barrel to which it is attached, and said spring means comprises a coiled spring adapted to be connected between a crossbar of a pedal to which said strip is to be attached and an adjacent portion of said supporting strip.

* * * * *